June 11, 1968  O. T. GIRALDI  3,387,910
TENSIONING DEVICE FOR SPECTACLE FRAMES
Filed June 18, 1964
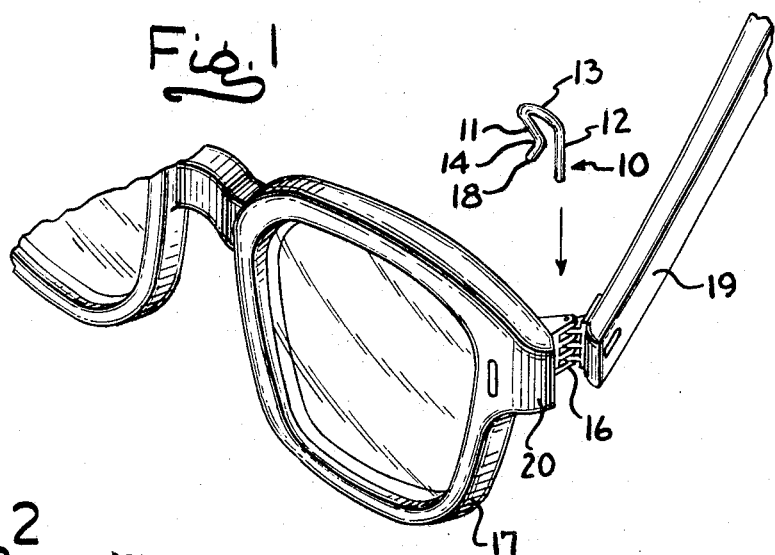
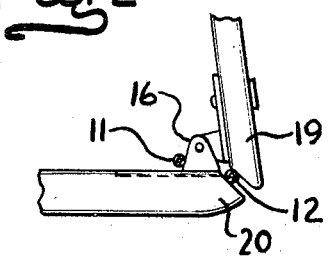
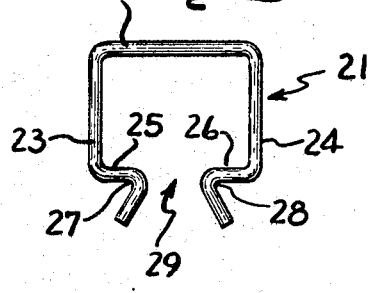
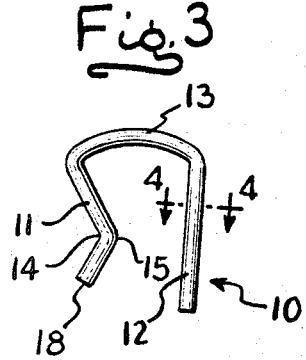
INVENTOR
ORLANDO T. GIRALDI
by: Garry, Parker, Juettner & Cullinan
ATTYS.

United States Patent Office 3,387,910
Patented June 11, 1968

3,387,910
TENSIONING DEVICE FOR SPECTACLE FRAMES
Orlando T. Giraldi, 5338 W. North Ave.,
Chicago, Ill. 60639
Filed June 18, 1964, Ser. No. 376,057
2 Claims. (Cl. 351—113)

ABSTRACT OF THE DISCLOSURE

A tensioning device in the form of a wire clip with a rubbery coating which may be readily adapted to the hinge portion of a spectacle frame for exerting a tension on the temples which extend along the sides of the head of the wearer for maintaining the spectacles in proper position on the face of the wearer.

This invention relates to a tensioning device for spectacle frames, and more particularly to a detachable device adapted to be hooked over the hinge portions of spectacles to exert tension on the temples thereof.

It is common in spectacle frames of the slip-on type for the plastic or metal temples thereof to become distorted or bent through constant use whereby they lose their gripping action against the side of the head and behind the ears and as a result permit the glasses to slip out of position. Heretofore, wire core temples have been incorporated in spectacle frames during the manufacture of same to exert tension on the temples and provide gripping action. However, such temples require professional adjustment when they become distorted. Also, separate detachable devices, such as rubber washers and springs, have been utilized in the past for exerting tension on the temples, but they likewise have proven unsightly and difficult to associate with the temples, usually requiring specially designed tools for the purpose. Also, some rubber washers being utilized have a tendency to mash and thereby "gum-up" or freeze the hinge.

An important object of the present invention is to provide a simple and inexpensive device which can be mounted on the hinge section of a spectacle frame for yieldably tensioning the temple members thereof.

A further object of the invention is to provide an improved temple tensioning device for spectacle frames which may be readily installed or removed with the fingers without the use of extraneous tools, and which is substantially hidden from view when in use.

Another object of the invention is the provision of a resilient device which provides a self adjusting cushion at the hinge portion of spectacle frames for tensioning the temples thereof.

This invention embodies other novel features, details of construction and arrangement of parts which are hereinafter set forth in the specification and claims and illustrated in the accompanying drawing, wherein:

FIG. 1 is a perspective view of one side of a spectacle frame showing the manner in which the tensioning device is hooked around a hinge which connects the temple to a side of the spectacle frame.

FIG. 2 is a fragmentary bottom plan view of one side of the spectacle frame showing the tensioning device in position around the hinge section.

FIG. 3 is a side elevational view of one form of tensioning device in accordance with my invention.

FIG. 4 is a sectional view taken substantially on the line 4—4 of FIG. 3.

FIG. 5 is a side elevational view illustrating a modified form of tensioning device in accordance with my invention.

Referring now to the drawing for a better understanding of the invention, and more particularly to FIGS. 1 to 4 thereof, a tensioning device 10 is shown as comprising a substantially U-shaped clamp provided with a radially extending crimped leg 11 and an opposing straight leg 12, both of which are connected by an integral loop portion 13, all of the components of the device 10 being of uniform thickness. The device is adapted to be formed from a length of round resilient wire of, for example, approximately .020" gauge, which is provided with a circular coating of flexible resilient cushioning material, as, for example, a deposit of latex or a rubbery material, such as neoprene, vinyl resin, or the like. The thickness of the coating material is approximately .045" gauge, so that the diameter of the device is approximately .065" gauge. This coating material gives a cushioning effect to the device when it is hooked into position on a hinge of a spectacle frame as will be later described.

Referring to FIG. 3 of the drawing, the device 10 is shown as comprising a length of coated resilient wire bent intermediate its ends to form a loop portion 13 and a pair of radially extending legs 11 and 12. The leg 11 is provided with an inwardly converging crimp 14, the base 15 of same being normally disposed a spaced distance from the opposing straight leg 12 in the same plane therewith and defining a pocket within the confines of the two legs and the connecting loop portion 13.

When the device has been formed in the manner illustrated and described, the metal and latex composition defining the inner surface of the loop end of the device is under compression, while the material defining the outer surface of the loop end is under tension, which permits the device to be hooked over a hinge 16 of the spectacle frame 17 (in the manner illustrated in FIG. 1) and frictionally held thereon. Inasmuch as the terminal end 18 of leg 11 is return bent outwardly at approximately a 30° angle from the crimp 14 it will act as a guide in flaring leg 11 outwardly while the device is being hooked into place over the hinge. When in place, the straight leg 12 will be in abutting relation with the outer side of hinge 16 while the crimped leg 11 will be held in frictional engagement against the inner side of hinge 16. When so associated, the straight leg 12 extends between the beveled end of temple 19 and a complementary beveled end of boss 20 on the eyeglass frame (as shown in FIG. 2) thus causing inward displacement of the temple 19 to tension same against the head of the wearer of the eyeglasses. The latex coating provided on the surface of the device acts as a cushion against the hinge as well as the temple and eyeglass frame to prevent shattering or breaking of same, and at the same time exerts sufficient tension to the temple to displace same in the manner described above. It will be apparent that when in use the device will be hidden from view as the beveled sections of the temple and boss 20 substantially cover same.

FIG. 5 illustrates a modification of my tensioning device, generally designated by the numeral 21. The device is a unitary structure, of uniform thickness, constructed from the same type of material described above for device 10. Device 21 is substantially U-shaped and comprises two legs 23 and 24 of uniform length extending radially from an integral connecting portion 22 in spaced parallel relation to each other. The free extremities 25 and 26 of legs 23 and 24 are bent inwardly at right-angles to the legs so they are in parallel relation to the connecting portion 22. In further development, extremities 25 and 26 are return bent at an oblique angle in the form of crimps 27 and 28, respectively, the bases of which are disposed in the same plane a spaced distance from each other to provide an opening, generally designated at 29.

Device 21 is attached to the hinge 16 of the eyeglasses by forcing the outer side of the hinge through opening 29 until the portion 22 contacts the hinge when the extremities 25 and 26, due to their flexibility, snap in place around the inner surface of the hinge. When device 21 is hooked onto the hinge in this manner it will cause inward displacement of the temple 19 and exert tension thereon in the manner described above for device 10.

It is contemplated that the diameter of the wire and its coating material may vary within the concept of this invention, depending upon the amount of tension desired and the size of the eyeglass frame hinge with which it will be used.

Many modifications of the present invention may be made by anyone skilled in the art without departing from the spirit of the invention. Hence, it is not intended that the invention be limited to the exact details shown and described except as necessitated by the appended claims.

I claim:

1. A detachable tensioning device in combination with spectacles of the type having temples pivotally connected to an eyeglass frame by means of hinges, said device comprising a substantially U-shaped member of resilient wire with a coating of rubbery material, said coating approximating the thickness of the wire, said U-shaped member having extending leg portions formed integral with a connecting member extending therebetween, one of said leg portions having an inwardly bent area intermediate the length thereof for engagement with a hinge portion of the eyeglass frame and the other of said leg portions being straight throughout its length and extending between the temple and the eyeglass frame of the spectacles adjacent the hinge for applying a tension to said temples when the spectacles are applied to the head of a wearer.

2. A detachable tensioning device in combination with spectacles of the type having temples pivotally connected to an eyeglass frame by means of hinges, said device comprising a substantially U-shaped member of resilient wire with a coating of rubbery material, said coating approximating the thickness of the wire, said U-shaped member having extending leg portions formed integral with a connecting member extending therebetween, said leg portions being parallel to each other, the free ends thereof being bent inwardly at right angles and then reversely bent outwardly at oblique angles to define end crimp portions to retain the member on the hinge portions with one parallel leg portion extending between the temple and the eyeglass frame of the spectacles adjacent the hinge for applying a tension to said temples when the spectacles are applied to the head of a wearer.

References Cited

UNITED STATES PATENTS

| | | | |
|---|---|---|---|
| 2,018,198 | 10/1935 | Baggett | 24—261 |
| 2,146,190 | 2/1939 | Luke | 24—262 X |
| 2,684,014 | 7/1954 | Fairly | 351—113 |
| 2,711,637 | 6/1955 | Wells | 24—66 X |
| 2,925,915 | 2/1960 | Weitermann | 24—262 |
| 3,156,757 | 11/1964 | Spina | 351—113 |

FOREIGN PATENTS

| | | |
|---|---|---|
| 1,283,359 | 12/1961 | France. |
| 480,332 | 4/1953 | Italy. |

DAVID H. RUBIN, *Primary Examiner.*